United States Patent [19]
Bakker

[11] Patent Number: 5,967,919
[45] Date of Patent: Oct. 19, 1999

[54] BELT TENSIONER

[75] Inventor: Emile A. M. Bakker, Gulpen, Netherlands

[73] Assignee: The Gates Corporation, Denver, Colo.

[21] Appl. No.: 08/943,641

[22] Filed: Oct. 3, 1997

[51] Int. Cl.[6] .............................. F16D 3/00; F16H 55/14; F16H 7/14; F16H 7/12
[52] U.S. Cl. .............................. 474/94; 474/115; 474/135
[58] Field of Search .............................. 474/94, 115, 133, 474/135, 136, 138; 188/379, 380; 267/141.1, 141.2, 141.3, 141.7

[56] References Cited

U.S. PATENT DOCUMENTS

| | | | |
|---|---|---|---|
| 4,472,162 | 9/1984 | Hitchcock | 474/135 |
| 4,473,362 | 9/1984 | Thomey et al. | |
| 4,723,934 | 2/1988 | Thomey | |
| 5,234,385 | 8/1993 | Kawashima et al. | 474/94 |
| 5,236,396 | 8/1993 | Golovatai-Schmidt et al. | 474/135 |
| 5,478,285 | 12/1995 | Bakker et al. | |
| 5,599,245 | 2/1997 | Giese | 474/135 |
| 5,620,385 | 4/1997 | Carcionale et al. | 474/135 |
| 5,630,768 | 5/1997 | Nakakubo et al. | 474/135 |
| 5,647,813 | 7/1997 | Serkh | 474/135 |
| 5,795,257 | 8/1998 | Giese et al. | 474/135 |

*Primary Examiner*—Tamara L. Graysay
*Assistant Examiner*—Matthew A. Kaness
*Attorney, Agent, or Firm*—C. H. Castleman, Esq.; S. G. Austin, Esq.; R. A. Jones, Esq.

[57] ABSTRACT

A belt tensioner of the Zed type with a pivot-arm, a pulley attached to the pivot-arm for receiving a belt load, a pivot, a base, and a torsion spring operatively connected between the pivot-arm and base and wherein damping of the pivot-arm is primarily provided by a pivot bushing in response to the belt load and a force generated by the spring.

12 Claims, 2 Drawing Sheets

BELT TENSIONER

BACKGROUND OF THE INVENTION

The invention relates to an automatic belt tensioner with a torsional spring that biases the position of a pivot-arm to which a belt engaging pulley is attached, but more particularly, the invention relates to a tensioner of the "ZED" type where a radial center plane for the pulley is laterally offset from an axis for a pivot about which the pivot-arm oscillates.

Automatic belt tensioners have a pivot-arm that pivots relative to a base. A pulley is rotatably mounted to the pivot-arm and a spring between the pivot-arm and base biases the position of the pivot-arm to place the pulley against an endless belt of a belt drive system to tension the belt while receiving a belt induced load. In some applications, it is preferred to have a bushing for the pivot to be in a common radial plane with the pulley to simplify or reduce loads that must be carried by the bushing. Within this category of tensioners, there is a type that has a bushing that provides both bearing support and damping to pivoted oscillatory movements of a pivot-arm. Such a tensioner is disclosed in U.S. Pat. No. 4,723,934 (B 1 4,723,934). Another example of a tensioner that has a bushing that provides both bearing support and damping to pivotal movements of a pivot-arm is disclosed in U.S. Pat. No. 5,478,285.

An example of a "ZED" type tensioner is disclosed in U.S. Pat. No. 4,473,362 where the tensioner has a pivot-arm attached to an off-set annular pivot member that supports the pivot-arm and oscillates on a post secured to a base. A torsion spring is used where one end of the spring is constrained at two points by a connection to the pivot-arm, and the other end of the spring is constrained by one connection to the base and one connection by way of a damping mechanism that includes a coil of the spring that presses against a sleeve which in turn presses against the annular pivot member. A single sleeve-type bushing located radially inward of the spring and positioned between the post and annular member, has a bearing surface that supports the annular member with its interconnected pivot-arm. The pivot bushing in connection with the damping mechanism, damps oscillatory movements of the pivot-arm. A problem with this type of tensioner is that the amount of available damping is somewhat limited because the pivot bushing and damping mechanism are located radially inward of the torsion spring and operate at a radius that is substantially less than the length of the pivot-arm.

Another example of a "ZED" type tensioner is disclosed in U.S. patent application Ser. No. 08/828,216 and has: a pivot-arm, a pivot-pin connected on one side to the pivot-arm, a base member of generally "tube-pan" shape holding at least one low friction bushing that supports the pivot-pin, a torsional spring with one end constrained and attached to the pivot-arm and another end constrained and attached to the base. The tensioner has a damping mechanism where an end of the spring is operatively connected to a damping mechanism that includes a shoe with an outside friction surface that rubs against an inside wall of the base member to effect damping. A characteristic associated with tensioners of this type is that substantially all of the damping is by way of the damping mechanism; very little damping is generated at the pivot bushing in response to a belt load received at a pulley.

SUMMARY OF THE INVENTION

In accordance with the invention, a tensioner is provided that is useful in V-ribbed front-end accessory belt drive systems used in automotive applications. The belt tensioner of the invention is of the "ZED" type with: a pivot-arm, a pulley attached to the pivot-arm for engaging the belt and receiving a belt load, a pivot in a form of a cantilevered annular pivot member with a fixed end attached to the pivot-arm, at least one pivot bushing, a base member that supports the pivot, a torsion spring operatively connected between the pivot-arm and base and wherein both bearing support and damping to oscillatory movements of the pivot-arm is primarily provided by a pivot bushing.

The base has a bottom wall from which extends a cantilevered post and a cantilevered annular base member which together define an annular cavity. The annular pivot member is positioned inside the annular base member with the pivot bushing positioned therebetween.

A wide stance between the reactionary force of the belt load and the reactionary force of a spring load is achieved by the way that the torsion spring is operatively connected or "hooked up" to bias the position of the pivot-arm relative to the base. A first end of the spring is constrained between first and second places at an open end of the post. A second end of the spring is constrained between a place at the free end of the annular pivot member and a place juxtaposed the bottom wall of the base member.

The advantage of the spring "hook-up" is that it gives a wide stance for the reactionary forces carried by the bushing and results in a bushing wear that does not substantially inhibit alignment of the pulley over an operative life of the tensioner. Also, the spring "hook-up" is such that a belt force received at the pulley and a spring force at the annular pivot member combine to provide a damping force reacted at the pivot bushing.

Another advantage of the invention is that the pivot bushing Is located radially outside the torsional spring to provide a high percentage damping.

These and other objects or advantages of the invention will be apparent after reviewing the drawings and description thereof wherein.

DESCRIPTION OF PREFERRED EMBODIMENTS

Figure 1:
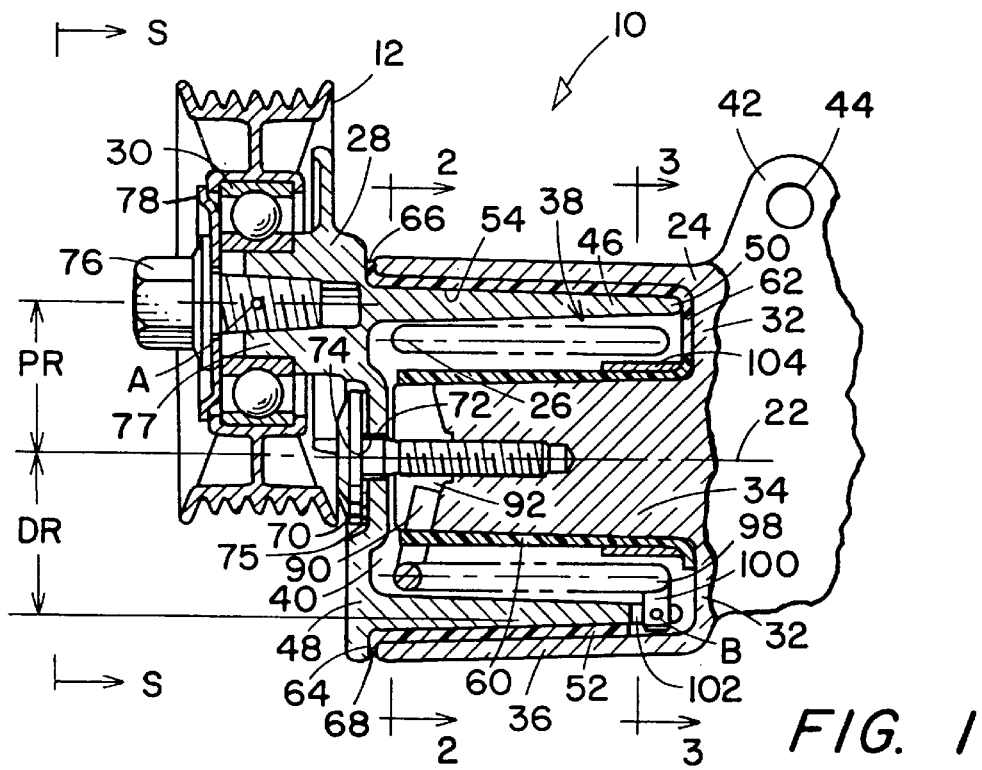
FIG. 1 is an elevational cross-sectional view of the tensioner of the invention.
Figure 2:
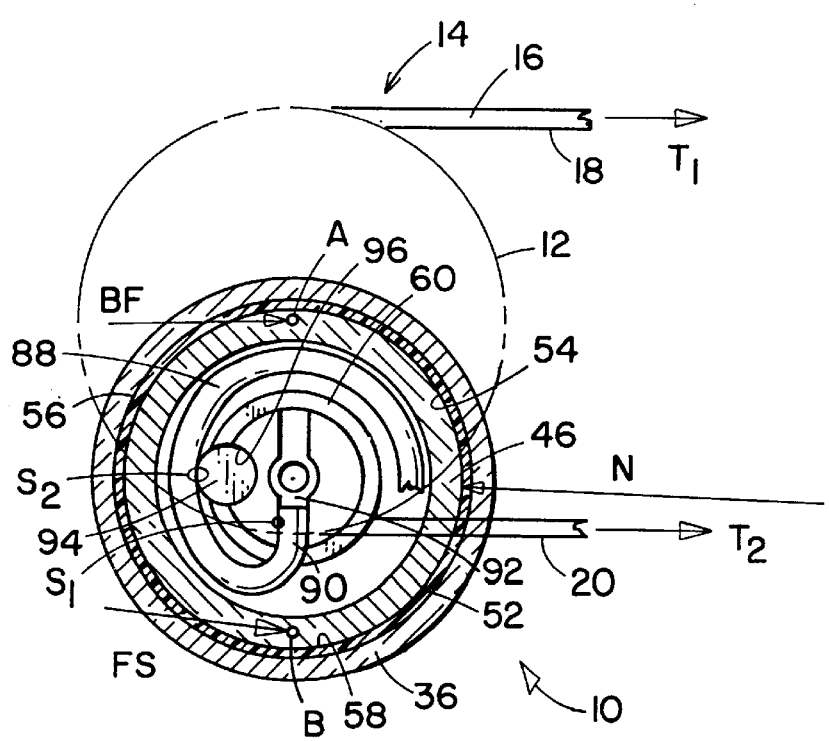
FIG. 2 is a partial schematic view taken in the direction S—S and cross-sectional view along the line 2—2 of FIG. 1 illustrating various components and forces associated with the tensioner.
Figure 3:
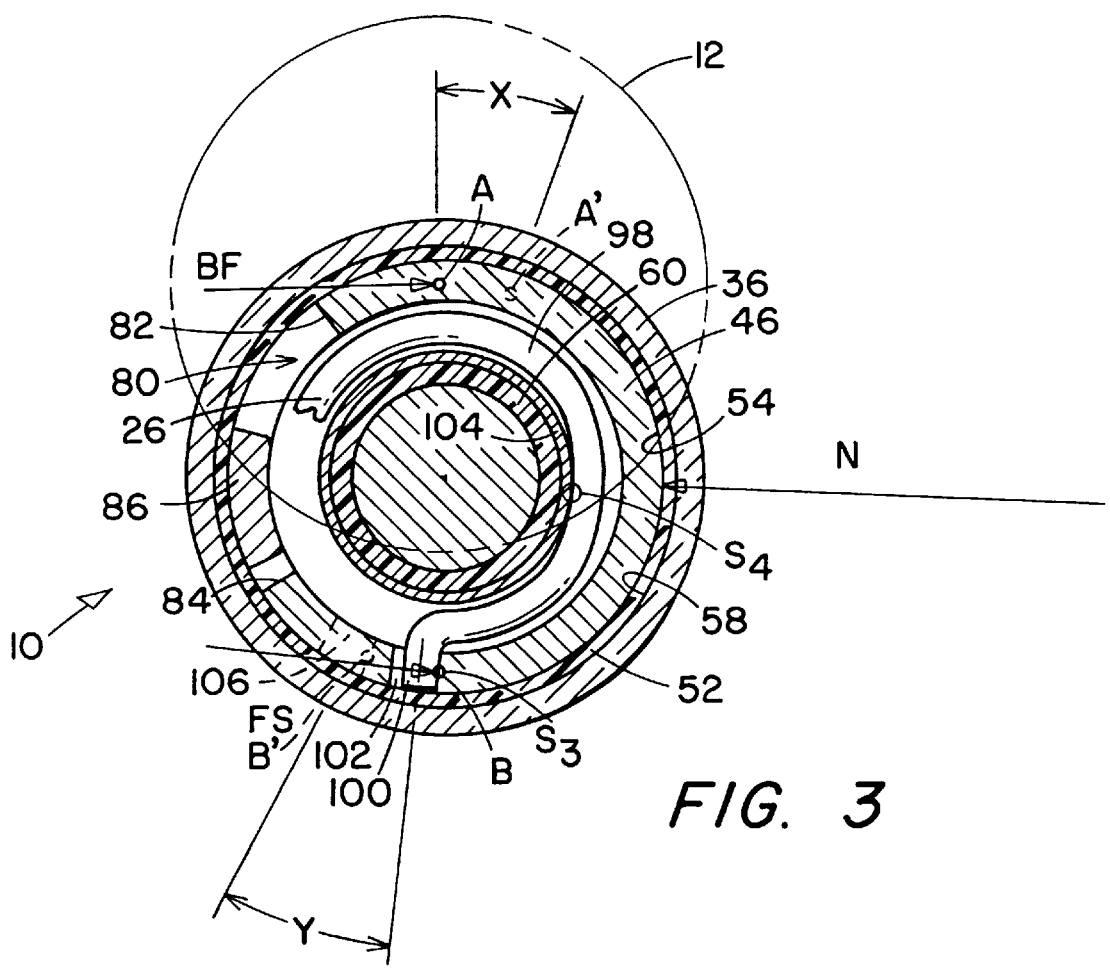
FIG. 3 is a partial schematic view taken in the direction S—S and cross-sectional view taken along the line 3—3 of FIG. 1 illustrating various components and forces associated with the tensioner.

Referring to FIGS. 1–3, a tensioner 10 with a pulley 12 is typically used in conjunction with a belt drive system 14 that includes a belt 16 constrained by several pulleys (not shown) and a tensioner pulley 12. The pulley 12 engages the belt 16 to adjust belt tension. When engaged with the belt, the pulley 12 receives a belt load in the form of belt tension T1, T2 of adjacent belt spans, 18, 20. The belt tension T1, T2 (or load) combine to generate a belt force component BF along a bisector of a angle formed between the belt spans 18, 20 and acting symbolically at point A. The belt force component acting at point A, being axially offset from pivot-pin 22 of the tensioner, generates a complicated internal load that includes forces and moments. Tensioners with such an axial offset are known as of the "ZED" type.

The tensioner 10 is of the mechanical type and includes a base member 24, a torsion spring 26, a pivot-arm 28 that oscillates in relation to the pivot axis 22, and a ball bearing 30 attached to the pivot-arm for rotateably mounting the pulley 12.

The base member 24 has a bottom wall 32 from which extends a cantilevered post 34 and a cantilevered annular base member 36 that together define an annular cavity 38. The base member 24 has an open-end 40 and is oriented so that its bottom wall 32 and open-end 40 face toward the pivot-arm 28. One or more ears 42 with bolt receiving holes 44 may be intergrately formed of the base member and used for attaching the tensioner with fasteners to an engine (not shown) to be part of the belt drive system 14.

A pivot in a form of a cantilevered annular pivot member 46 has a fixed end 48 formed as an integral part of the pivot-arm 28. An open-end of the annular pivot member protrudes into the annular cavity 38 such that the annular pivot member is positioned inside the annular base member 36.

At least one pivot bushing 52 of preferably the polymeric type is interpositioned between an outside surface 54 of the annular pivot member and an inside surface 56 of the annular base member. The bushing has an inside surface 58 that provides both bearing support and friction for damping to oscillatory sliding movements of the annular pivot member with the connected pivot-arm. The pivot bushing, annular member, and annular base member have any complimentary shapes in relation to each other such as cylindrical or tapered.

A second bushing 60 also preferably of the polymeric type, is positioned over the post 34. Optionally, the pivot bushing and second bushing may be formed together as one composite bushing having generally a "tube-pan" shape.

An extension of the pivot-arm 28 and the integral fixed-end 48 may include a radial flat 64 extending circumferencially juxtaposed a wall 66 of the open-end 48 of the annular base member 36. Optionally, the pivot bushing includes a radial flange 68 positioned between the radial flat of the pivot-arm and the wall of the annular base member.

The pivot-arm 28 is secured to the cantilevered post 34 of the base member 24 by a fastener such as a bolt 70 or a stacked or riveted washer.

The bolt 70 extends through a hole 72 formed in the pivot-arm 28 wherein the hole has a larger diameter than an outside diameter of the fastener to ensure a clearance 74 between the two parts. As assembled, the radial flange 68 operates as a thrust washer and dust shield between the base and the pivot-arm and also serves to help maintain a radial alignment of the pivot-arm in relation to the base member. A sealing disc 75 between the bolt head and pivot-arm acts as thrust washer that carries an axially extending load generated by the torsional spring upon assembly. The axially extending load helps improve spring tang hook-ups S1, S2 S3.

The pulley 12 Is rotateably mounted to the pivot-arm 28 by means of the ball bearing 30 which is positioned on a stub-shaft 77 formed of the pivot-arm 28. The ball bearing 30 is retained on the stub-shaft by a fastener such as a bolt 76 and washer 78.

Optionally, a stop to limit annular movements of the pivot-arm may be included and formed between the base member and pivot-arm which is best illustrated in FIG. 3. An arcuate cutout 80 is formed in the annular pivot member leaving radial walls 82, 84 as stops formed of a radial wall. A projection 86 formed of the bottom wall 32 of the base member protrudes into the arcuate cutout. The projection 86 in conjunction with stops 82, 84 formed of the annular pivot member limits oscillatory movements of the pivot-arm.

The torsion spring is located in the annular cavity 38 between the cantilevered post 34 and cantilevered base member 36 and is operatively connected to bias the position of the pivot-arm relative to the base member.

Referring more particularly to FIGS. 1 and 2, a first end 88 of the spring 26 has a tang 90 bent radially inwardly that extends into a slot 92 formed in the free end of the cantilevered post 34. A pin 94 is positioned in a second slot 96 formed in the free end of the cantilevered post 96. A first end of the spring is constrained between a first place S1 at the slot 92 and a second place S2 at the pin 94. All loads from the spring at places S1, S2 are carried directly by the cantilevered post 34 of the base member 24.

Referring to FIGS. 1 and 3, a second end 98 of the spring 24 has a tang 100 bent radially outwardly that extends into a radial slot 102 formed in the free end of the annular pivot member 46. A sleeve 104 is positioned over the second bushing juxtaposed the bottom wall 32 of the base member. The second end of the spring is constrained between a third place S3 at the free end of the annular pivot member and a fourth place S4 at the sleeve juxtaposed the bottom wall of the base member. The load from the spring end at place S4 is transmitted to the sleeve 104, then to the second bushing 60, and then to the cantilevered post 34 of the base member. Tang 100 of the second spring end imparts a spring force FS to the annular pivot member at some point B which corresponds to where the spring is constrained at place S3.

The belt force imparted at point A and the spring force imparted at point B are in the same general direction and are carried by the annular pivot member. Pivot bushing 52 supports the annular pivot member whereby belt force BF and spring force FS are balanced by a reactionary force N. There is friction between the sliding surface of the annular pivot-arm member and pivot-arm bushing which acts to damp oscillatory movements of the pivot-arm. The sliding surfaces operate at a mean radius DR which may be larger or smaller than a radius PR of the pivot-arm. Both pivotal movements and damping are effected by the pivot bushing. There is a small amount of damping effected between the sleeve 104 and second bushing 60.

As more particularly illustrated in FIG. 3, the location of the belt force BF moves from point A to point A' in conjunction with angular movements X of the pivot-arm. However, there is very little change in the direction of the belt force BF. The annular pivot member angularly moves with angular movements of the pivot-arm, and hence, the spring slot moves to a new location 106 as represented by the dotted lines at an angle Y (which is equal to angle X). The location of the spring force FS moves from point B to point B'. The force FS imparted by the spring at point B changes direction as it moves to point B' and remains substantially perpendicular to the slot at its new location 106.

The belt force BF and spring force FS combine to effect a damping force at the bushing that is balanced by the reactionary force N. The large diameter DR of the bushing (i.e. configured outside the torsion spring) along with its length suppresses wear and pulley misalignment.

A foregoing description is made for the purpose of illustration only and is not intended to limit the scope of the invention which is to be determined by the appended claims.

What is claimed is:

1. A tensioner for tensioning a power transmission belt having a pivot-arm; a pulley attached to the pivot-arm for engaging the belt and receiving a belt load; a pivot in the form of a cantilevered annular pivot member with a fixed end attached to the pivot-arm; at least one pivot bushing; a base member that supports the pivot; a torsion spring operatively connected to bias the position of the pivot-arm relative to the base member; slideable surfaces for damping oscillatory movements of the pivot-arm through generation of friction; and wherein the improvement comprises:

the base member having a bottom wall interconnecting a cantilevered post and a cantilevered annular base member that together define an annular cavity;

the annular pivot member having an open end that protrudes into the annular cavity such that the annular pivot member is telescopically positioned in relation to the annular base member;

the pivot bushing interpositioned between an outside surface of the annular pivot member and an inside surface of the annular base member, and the bushing having an inside surface that provides both bearing support and friction for damping to oscillatory sliding movements of the annular pivot member with the connected pivot-arm; and the spring having a first end constrained between first and second places at an open end of the post and a second end constrained between a third place at the free end of the annular pivot member and a fourth place juxtaposed the bottom wall of the base member.

2. The tensioner as claimed in claim 1 wherein the second end of the spring is retained at a position on the annular pivot member in a circumferential location such that a force imparted by the spring to the third place in combination with a belt force generated by the belt load generate a reactionary force at the bushing to effect damping.

3. The tensioner as claimed in claim 1 including the post having a substantially cylindrical surface portion juxtaposed the bottom wall, a post bushing positioned over the post, and a flat ring positioned over the post bushing juxtaposed the second end and a coil of the spring, and wherein the cylindrical surface, post bushing and spring coil defining the fourth place juxtaposed the bottom wall of the base member where the second end of the spring is constrained.

4. The tensioner as claimed in claim 3 wherein the pivot bushing and post bushing are formed together as one composite having generally a tube-pan shape.

5. The tensioner as claimed in claim 3 wherein the pivot bushing, annular pivot member and annular base member are complimentary tapered in relation to each other.

6. The tensioner as claimed in claim 3 wherein the pivot-arm has a radial flat extending circumferentially juxtaposed a wall of the open end of the annular base member, and the pivot bushing includes a radial flange positioned between the radial flat of the pivot-arm and the wall of the open end of the annular base member.

7. The tensioner as claimed in claim 3 wherein the base member includes a projection extending from the base wall and into an arcuate slot formed in the open end of the annular pivot member, the slot and projection together restricting movement of the pivot-arm to a predetermined angular amount.

8. A belt tensioner for tensioning a power transmission belt, comprising:

a pivot-arm;

a pulley attached to the pivot-arm for engaging the belt and receiving a belt load;

a base member having a bottom wall, a centrally positioned cantilevered post protruding from the bottom wall, and a radially outwardly positioned cantilevered annular base member protruding from the bottom wall which, together with the cantilevered post, define an annular cavity therebetween;

a cantilevered annular pivot member fixedly attached to the pivot-arm and having an open end that protrudes into the annular cavity such that the annular pivot member is telescopically positioned in relation to, and arranged for relative rotational movement with, the annular base member;

a pivot bushing interpositioned between an outside surface of the annular pivot member and an inside surface of the annular base member, the pivot bushing having a surface that provides both bearing support and friction for damping oscillatory sliding movements of annular pivot member in response to belt loading transmitted to the pivot-arm; and a torsion spring positioned within the annular cavity and radially inwardly of the pivot bushing and operatively connected to bias the position of the pivot arm relative to the base member, and having a first end constrained within an opening in the cantilevered post, and a second end constrained within an opening in the annular pivot member.

9. The belt tensioner as claimed in claim 8 further including, a fastener securing the pivot-arm to the cantilevered post, and a thrust washer interpositioned between one end of the fastener and the pivot-arm such that, in use, axially extending loads generated by the torsion spring are carried by the thrust washer.

10. The belt tensioner as claimed in claim 9 wherein the fastener is a bolt having a head, and a threaded portion engaging a central opening in the cantilevered post, and the thrust washer is in the form of a sealing disc positioned between the head and pivot-arm.

11. The belt tensioner as claimed in claim 8 wherein the torsion spring has a first end constrained between first and second places at an open end of the post and a second end constrained between a third place at the free end of the annular pivot-member and a fourth place juxtaposed the bottom wall of the base member.

12. The belt tensioner as claimed in claim 11 wherein the second end of the torsion spring is constrained at the third place of the annular pivot member such that the spring force (FS) is substantially parallel to the belt force (BF) resulting from the belt load acting on the pulley and is balanced by a reactionary force (N).

* * * * *